(12) United States Patent
Haski

(10) Patent No.: US 10,004,357 B2
(45) Date of Patent: Jun. 26, 2018

(54) SELF-COMBUSTING IGNITION DEVICE

(71) Applicant: Tomer Haski, Haifa (IL)

(72) Inventor: Tomer Haski, Haifa (IL)

( * ) Notice: Subject to any disclaimer, the term of this patent is extended or adjusted under 35 U.S.C. 154(b) by 337 days.

(21) Appl. No.: 14/684,517

(22) Filed: Apr. 13, 2015

(65) Prior Publication Data

US 2015/0289717 A1     Oct. 15, 2015

(30) Foreign Application Priority Data

Apr. 13, 2014   (IL) .......................................... 232133

(51) Int. Cl.
*A47J 37/07*     (2006.01)
*A47J 31/60*     (2006.01)
*B23P 11/00*     (2006.01)
*F23Q 13/00*     (2006.01)

(52) U.S. Cl.
CPC .............. *A47J 37/079* (2013.01); *A47J 31/60* (2013.01); *B23P 11/00* (2013.01); *F23Q 13/00* (2013.01)

(58) Field of Classification Search
CPC ............ A47J 31/60; F23Q 13/00; B23P 11/00
USPC ................ 126/25 B, 9 B, 25 R, 144
See application file for complete search history.

(56) References Cited

U.S. PATENT DOCUMENTS

| | | | | |
|---|---|---|---|---|
| 2,834,661 A | * | 5/1958 | Chaplin | C10L 11/04 126/25 B |
| 3,307,506 A | * | 3/1967 | Rose | A47J 37/079 126/163 R |
| 3,317,290 A | * | 5/1967 | Gentry | A47J 37/0768 44/520 |
| 3,377,147 A | * | 4/1968 | Remines | A47J 37/0768 44/519 |
| 4,026,265 A | * | 5/1977 | Spadaro | A47J 37/079 126/25 B |
| 4,311,130 A | * | 1/1982 | Noose | F23Q 13/00 126/25 B |
| 4,320,736 A | * | 3/1982 | Sharon | F24B 1/003 126/19 M |
| 4,909,235 A | * | 3/1990 | Boetcker | A47J 37/0704 126/25 C |
| 4,953,533 A | * | 9/1990 | Witt | A47J 37/0768 126/25 B |
| 5,197,455 A | * | 3/1993 | Tessien | A47J 37/079 126/144 |
| 5,469,835 A | * | 11/1995 | Stephen | A47J 37/079 126/146 |
| 7,107,983 B1 | * | 9/2006 | West | A47J 33/00 126/25 R |

(Continued)

FOREIGN PATENT DOCUMENTS

DE      9401376 U1     9/1994
DE     20303440 U1    10/2003

(Continued)

*Primary Examiner* — Gregory Huson
*Assistant Examiner* — Nikhil Mashruwala
(74) *Attorney, Agent, or Firm* — Roach Brown McCarthy & Gruber, P.C.; Kevin D. McCarthy

(57) ABSTRACT

A self-combusting ignition device comprising a hollow, funnel-shaped body made of a combustible material which is devoid of charcoal, said body having (a) a relatively narrow top opening and a relatively wide bottom opening, and (b) at least one ventilation conduit adjacent said relatively wide bottom opening.

20 Claims, 3 Drawing Sheets

(56) References Cited

U.S. PATENT DOCUMENTS

| | | | | |
|---|---|---|---|---|
| 2006/0225724 A1* | 10/2006 | Turner | ...................... | F24C 1/16 |
| | | | | 126/9 R |
| 2009/0277437 A1* | 11/2009 | Fischer | ................. | A47J 37/079 |
| | | | | 126/25 B |
| 2013/0032134 A1* | 2/2013 | Valzania Fresa | ..... | A47J 37/079 |
| | | | | 126/25 B |
| 2015/0144121 A1* | 5/2015 | Swatling | ............... | A47J 37/079 |
| | | | | 126/25 B |

FOREIGN PATENT DOCUMENTS

| | | |
|---|---|---|
| FR | 2814357 A1 | 3/2002 |
| WO | 2009137276 A1 | 11/2009 |

* cited by examiner

SELF-COMBUSTING IGNITION DEVICE

CROSS-REFERENCE TO RELATED APPLICATIONS

This application claims priority from Israel Patent Application No. 232133, filed Apr. 13, 2014, entitled "Self-Combusting Ignition Device".

FIELD OF THE INVENTION

The invention relates to the field of ignition devices.

BACKGROUND

Outdoor cooking is an immensely popular activity enjoyed by many people. The burning of combustible fuel pieces from coal to charcoal to wood chips is well known. Common applications include burning charcoal in a backyard barbecue and burning coal lumps in a fireplace.

Commonly, the actual combustible material is sold and stored in bulk containers. For instance, a 10 or 20 lb bag of charcoal can be kept in a consumer's garage next to their barbecue grill. Chunks of coal or wood may also be shipped in heavy bag containers. In each case, a consumer dispenses a portion of the pieces of combustible material to be burned. For instance, the consumer may pour briquettes from a charcoal bag into a grill then arrange them into a solid pyramid.

It is often said that the combustion of these materials is not very efficient. The classic "pile" of charcoal briquettes in a grill burns slowly and inefficiently. This arrangement of charcoal typically requires some accelerant either applied onto or soaked into the briquette mixture. Also, airflow must usually be handled in order to achieve a quick and even burn.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a self-combusting ignition device comprising a hollow, funnel-shaped body made of a combustible material which is devoid of charcoal, said body having (a) a relatively narrow top opening and a relatively wide bottom opening, and (b) at least one ventilation conduit adjacent said relatively wide bottom opening.

Another embodiment relates to a method for igniting flammable elements, the method comprising: positioning a self-combusting ignition device inside a barbecue grill, said device comprising a hollow, funnel-shaped body made of a combustible material which is devoid of charcoal, said body having (a) a relatively narrow top opening and a relatively wide bottom opening, and (b) at least one ventilation conduit adjacent said relatively wide bottom opening; piling up the flammable elements over said device; and igniting said device, thereby causing at least some of the flammable elements to ignite and, upon said device being consumed by combustion, to settle inside the barbecue grill.

Optionally, said funnel-shaped body is concave.

Optionally, said at least one ventilation conduit is multiple ventilation conduits.

Optionally, said multiple ventilation conduits are each a half-cylindrical niche.

Optionally, said combustible material comprises paper.

Optionally, said combustible material comprises cardboard.

Optionally, said combustible material comprises corrugated cardboard.

Optionally, said body is soaked in liquid fuel.

Optionally, said relatively wide bottom opening is defined by an elevated bottom rim, configured to prevent charcoal pieces which are piled up over the device from slipping over.

Optionally, the piling up is over a majority of an outer surface of said device.

Optionally, the flammable elements comprise charcoal pieces.

Optionally, the igniting of said device is by throwing a burning piece of paper into said relatively narrow top opening.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A self-combusting ignition device is disclosed herein. The device may be made, fully or partially, from a combustible material, and be used to ignite one or more other flammable elements, such as pieces of charcoal, wood, etc. For simplicity of discussion, these flammable elements are hereinafter referred to as "charcoal pieces", although other types of flammable elements, such as pieces of wood or the like, are intended herein as well. The device may be manually ignited by a user, causing the device to self-combust and, in turn, ignite the charcoal pieces which are piled over it.

Figure 1:
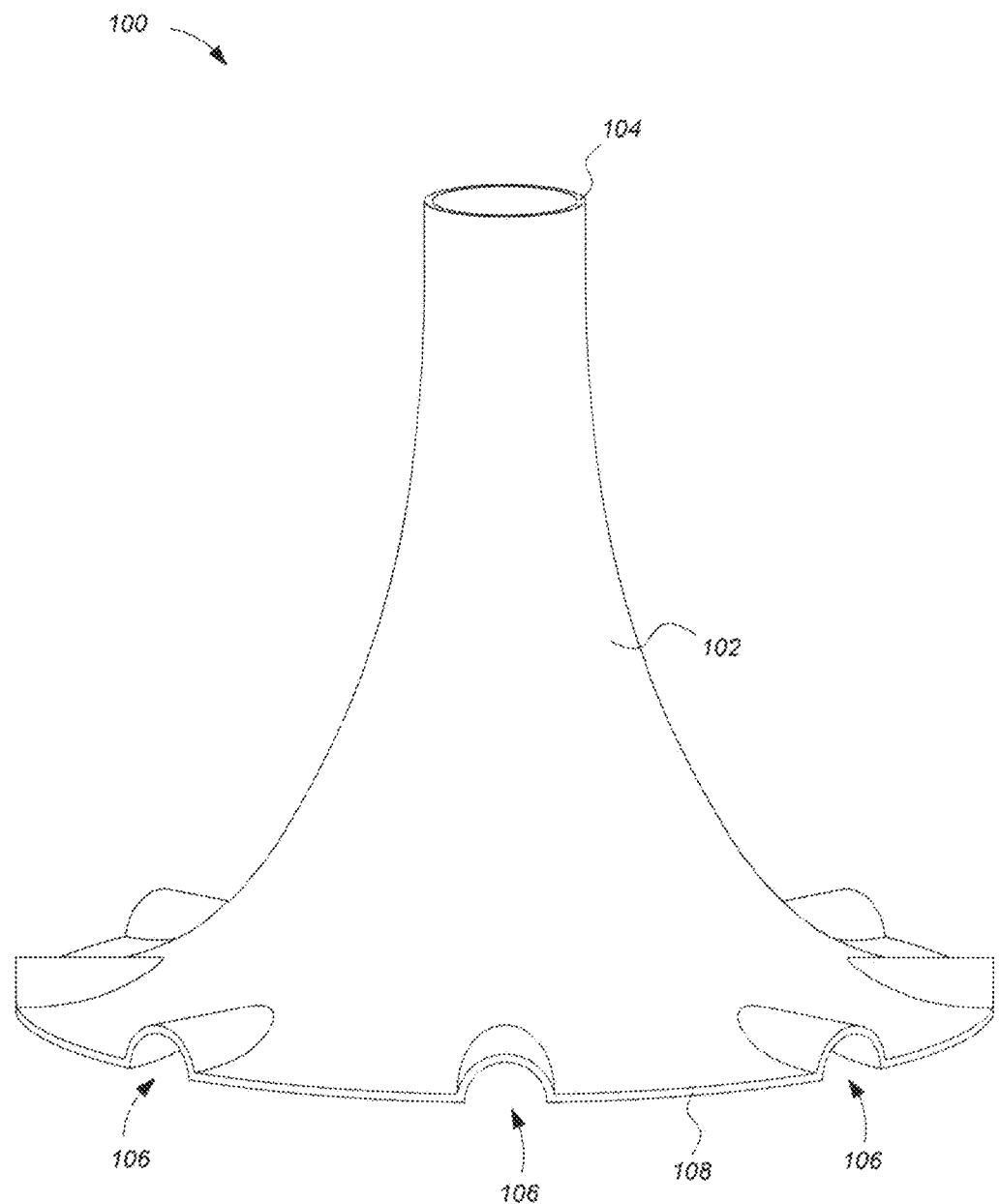
FIG. 1 shows a perspective view of a self-combusting ignition device.
Figure 2:
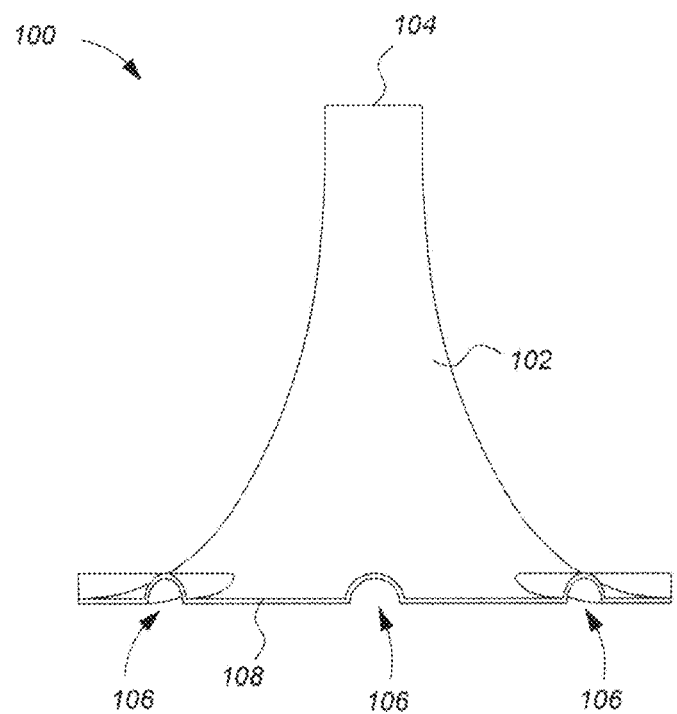
FIG. 2 shows a side view of the self-combusting ignition device of FIG. 1.
Figure 3:
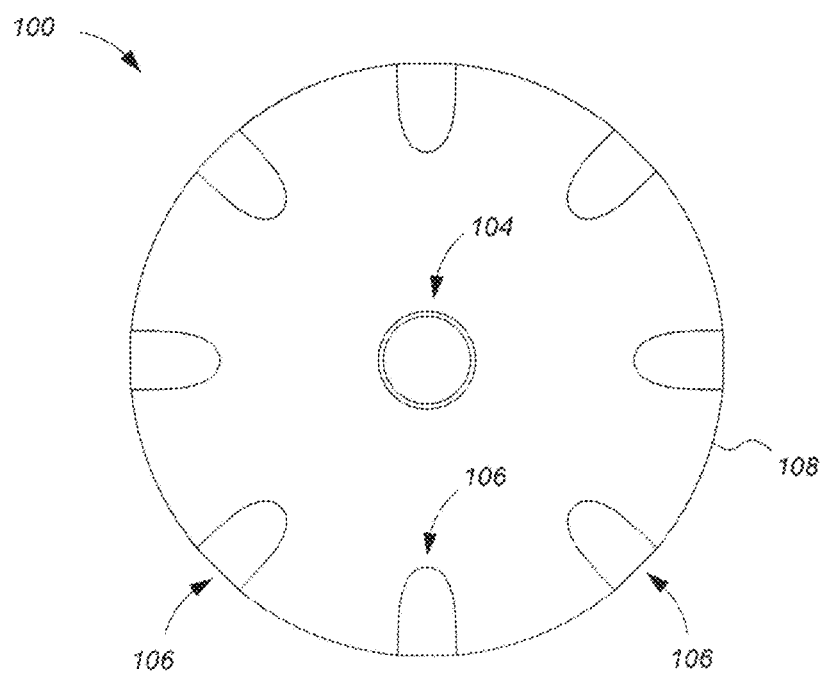
FIG. 3 shows a top view of the self-combusting ignition device of FIG. 1.

Reference is now made to FIGS. 1, 2 and 3, which show a perspective view, a side view and a top view of a self-combusting ignition device (hereinafter simply "device") 100, in accordance with an exemplary embodiment. It should be noted that device 100 may look essentially the same when looked at from the top and from the bottom. Hence, the top view of FIG. 3 may be similar to a bottom view of the device, and any differences may be only those derived from a thickness of the body of device 100—which differences may be barely noticeable between bottom and top views.

Device 100 may have a body 102 generally shaped as a concave funnel, which may be positioned essentially upside-down when in use. Namely, the narrower opening of the funnel is at its top, while the wider opening of the funnel is at its bottom. In the figure, the narrower opening is defined by a top rim 104, while the wider opening is defined by a bottom rim 108.

In some embodiments (not shown), a body of a self-combusting ignition device, or at least a portion of the body, may be shaped differently than what FIGS. 1-3 show, for example as a convex funnel, a cone, a triangular pyramid, a rectangular pyramid—or any other hollow shape having a wider opening at its bottom and a narrower opening at its top.

A thickness of body 102 is optionally substantially uniform along the entirety of the body. For example, the thickness of body 102 may be between 1-2 millimeters, 2-3 millimeters, 3-4 millimeters, 4-5 millimeters, 5-6 millimeters, 6-7 millimeters, 7-8 millimeters, 8-9 millimeters, 9-10 millimeters, or more. Alternatively, the thickness of body 102 may be non-uniform, namely—some areas may be thicker than others.

Body 102 may be made of one or more solid, combustible materials, or of a combination of one or more solid combustible materials with one or more solid, non-combustible materials. The term "solid, non-combustible materials" refers to solid materials whose flash point is higher than temperatures typically reached to in barbecue grill fires. Solid, non-combustible materials may include, for example, various reinforcement structures which may be used within body 102, such as metallic meshes, metallic threads, etc.

Examples of suitable solid, combustible materials for body 102 include various types of paper products (e.g. paper sheets, cardboard, corrugated cardboard, etc.), various fabrics (e.g. of animal sources, plant sources, etc.), various types of processed wood, and more. The one or more solid, combustible materials of body 102 may be characterized as being easily ignitable, such as by holding a burning match, a portable lighter and/or burning object next to them for a brief duration (e.g. up to a few seconds).

Additionally or alternatively, body 102 may be made combustible (or its degree of combustibility be enhanced) by soaking it in liquid fuel. This may be performed either during manufacturing or by the user, just prior to igniting device 100. If body 102 is soaking in liquid fuel during manufacturing, it may be consecutively packed in a sealed package, such as a plastic wrap, such that the liquid fuel does not vaporize until device 100 is being used.

In some embodiments, body 102 is devoid of charcoal of any form and shape. In some embodiments, body 102 does not have any charcoal attached to it. Instead, charcoal may be piled up over body 102 when use of device 100 is desired; during this piling up, the charcoal does not become attached to body 102 but rather sits over it freely.

Body 102 may include one or more ventilation conduits adjacent its bottom opening, such as conduits 106. Conduits 106 may be shaped as half-cylindrical niches in body 102, which niches disrupt the generally circular circumference of bottom rim 108. When device 100 is positioned on an essentially flat surface, bottom rim 108 may contact the surface (fully or partially), while conduits 106 provide pathways for air to flow into an inside void of body 102.

The embodiment of FIGS. 1-3 shows eight conduits 106 (only three of which are referenced, for the sake of simplicity); however, other embodiments (not shown) may include a different number of conduits, such as 1, 2, 3, 4, 5, 6, 7, 9, 10, 11, 12 or more.

In some embodiments (not shown), a body of a self-combusting ignition device may include, adjacent to its bottom rim, one or more ventilation conduits shaped differently than what FIGS. 1-3 show, as long as these ventilation conduits allow air to flow into an inside void of the body when the body is positioned on an essentially flat surface.

In some embodiments (not shown), a bottom rim of a self-combusting ignition device may be elevated, to essentially form a circumferential concave bowl around the lower part of the device. Namely, the elevated rim may prevent charcoal pieces which are piled up over the device from slipping over its lowermost edges. Those of the charcoal pieces which get supported by this bottom rim, may serve to support charcoal pieces which are positioned higher up over the device.

Figure 4:
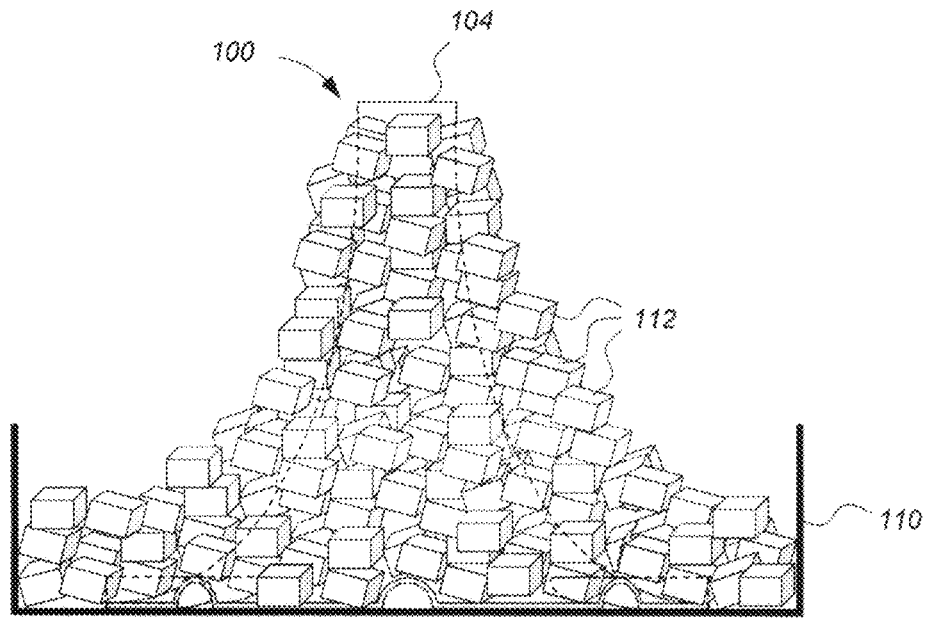
FIG. 4 shows a side view of the self-combusting ignition device of FIG. 1, inside a barbecue grill.

Reference is now made to FIG. 4, which shows device 100 of FIGS. 1-3, positioned inside a barbecue grill 110, which is shown only schematically. Barbecue grill 110 may be shaped, for example, as a container open at its top (or being equipped with a removable cover at its top). Namely, barbecue grill 110 may have at least a bottom surface (which is optionally essentially flat) and side walls encircling the bottom surface. In this figure, parts of device 100 which are hidden behind charcoal pieces are shown with phantom lines.

Device 100 may be used, in some embodiments, according to the following method:

First, device 100 may be positioned in a suitable location for setting fire, such as inside barbecue grill 110 or even on bare ground. Optionally, a surface (e.g. of the barbecue grill) on which device 100 is positioned is substantially flat.

Then, a plurality of flammable elements, such as charcoal pieces 112, may be piled up over device 100, to form an array of the charcoal pieces over at least a majority of the area of the outer surface of the device. For simplicity of presentation, only three charcoal pieces 112 are referenced in FIG. 4, although the figure shows many more charcoal pieces.

A user piling up charcoal pieces 112 over device 100, may start by piling them over the lower part of the device, so as to fill a space between that lower part and walls of barbecue grill 110. As the piling up continues, charcoal pieces 112 begin covering device 100 higher up, finally forming an array resembling a somewhat amorphous pyramid over the device. The piling up may be done by pouring charcoal pieces 112 from a bag, by positioning them manually, by use of a hand tool, or by combination of any of the above.

Finally, device 100 may be ignited using a fire source such as a match, a portable lighter, a burning piece of paper, and/or any other means of ignition. In some embodiments, the device may be ignited by simply throwing a burning piece of paper into its inner void, such as through top rim 104.

As device 100 catches fire, it may exhibit what is known as the chimney affect (also "stack effect"). Namely, oxygen-containing air may be drawn, due to the combustion, through the ventilation conduits (which are not referenced in FIG. 4, merely for simplicity of illustration, but are nonetheless observable) and into the inner void of device 100. The inner void of device 100 hence acts as its flue. Exhaust gasses resulting from the self-combustion of device 100 may be emitted to the atmosphere through top rim 104. Accordingly, device 100 may also be referred to as a combined device, acting as a self-combustible igniter and a chimney.

Figure 5:
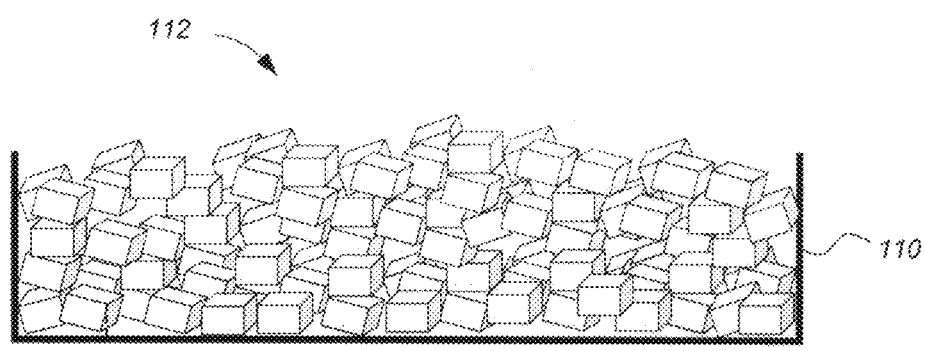
FIG. 5 shows a side view of the barbecue grill after the self-combusting ignition device has been consumed.

The self-combustion of device 100 causes charcoal pieces 112, or at least some thereof, to ignite as well. As device 100 self-combusts, its material (or at least a part thereof, in case its body contains also a non-combustible material) is also gradually consumed, such that the burning (or partly burning) charcoal pieces 112 gradually collapse and settle into an essentially flat formation inside barbecue grill 110, allowing their use for barbecue grilling. FIG. 5 illustrates this; the device is no longer shown, and charcoal pieces 112 have settled into a formation which is overall lower than before.

If the charcoal pieces do not settle into a satisfactory formation, a user may manually manipulate them at his or her desire, for example using a hand tool such as a stick. A grill mesh and/or a rotisserie (not shown) may then be positioned over the settled charcoal pieces, as known in the art, for cooking food.

In the description and claims of the application, each of the words "comprise" "include" and "have", and forms thereof, are not necessarily limited to members in a list with which the words may be associated.

What is claimed is:

1. A self-combusting ignition device comprising a hollow, funnel-shaped body made of a combustible material which is devoid of charcoal, said body having (a) a relatively narrow top opening and a relatively wide, circular bottom opening, and (b) at least one ventilation conduit adjacent said relatively wide, circular bottom opening, wherein said funnel-shaped body is concave.

2. The device according to claim 1, wherein said device is used inside a barbeque grill.

3. The device according to claim 1, wherein said at least one ventilation conduit is multiple ventilation conduits.

4. The device according to claim 3, wherein said multiple ventilation conduits are each a half-cylindrical niche.

5. The device according to claim 1, wherein said combustible material comprises paper.

6. The device according to claim 1, wherein said combustible material comprises cardboard.

7. The device according to claim 1, wherein said combustible material comprises corrugated cardboard.

8. The device according to claim 1, wherein said body is soaked in liquid fuel.

9. The device according to claim 1, wherein said relatively wide bottom opening is defined by an elevated bottom rim, configured to prevent charcoal pieces which are piled up over the device from slipping over.

10. A method for igniting flammable elements, the method comprising:
    positioning a self-combusting ignition device inside a barbecue grill, said device comprising a hollow, funnel-shaped body made of a combustible material which is devoid of charcoal, said body having (a) a relatively narrow top opening and a relatively wide, circular bottom opening, and (b) at least one ventilation conduit adjacent said relatively wide, circular bottom opening, wherein said funnel-shaped body is concave;
    piling up the flammable elements over said device; and
    igniting said device, thereby causing at least some of the flammable elements to ignite and, upon said device being consumed by combustion, to settle inside the barbecue grill.

11. The method according to claim 10, wherein the piling up is over a majority of an outer surface of said device.

12. The method according to claim 10, wherein the flammable elements comprise charcoal pieces.

13. The method according to claim 10, wherein the igniting of said device is by throwing a burning piece of paper into said relatively narrow top opening.

14. The method according to claim 10, wherein said at least one ventilation conduit is multiple ventilation conduits.

15. The method according to claim 14, wherein said multiple ventilation conduits are each a half-cylindrical niche.

16. The method according to claim 10, wherein said combustible material comprises paper.

17. The method according to claim 10, wherein said combustible material comprises cardboard.

18. The method according to claim 10, wherein said combustible material comprises corrugated cardboard.

19. The method according to claim 10, wherein said body is soaked in liquid fuel.

20. The method according to claim 10, wherein said relatively wide bottom opening is defined by an elevated bottom rim, configured to prevent the flammable elements which are piled up over the device from slipping over.

* * * * *